United States Patent [19]

Ishikawa

[11] 4,345,277

[45] Aug. 17, 1982

[54] LINEAR LIGHT SOURCE FIXING DEVICE USED IN A FACSIMILE TRANSMISSION APPARATUS

[75] Inventor: Masaaki Ishikawa, Hachioji, Japan

[73] Assignee: Tokyo Shibaura Denki Kabushiki Kaisha, Kawasaki, Japan

[21] Appl. No.: 223,081

[22] Filed: Jan. 7, 1981

[30] Foreign Application Priority Data

Jan. 18, 1980 [JP] Japan .................................. 55/4390[U]

[51] Int. Cl.³ .............................................. H04N 1/24
[52] U.S. Cl. ...................................... 358/293; 362/226
[58] Field of Search ................... 358/293, 294; 362/226

[56] References Cited

U.S. PATENT DOCUMENTS 4,082,444 4/1978 Menon ................................. 358/293

FOREIGN PATENT DOCUMENTS 2701620 7/1978 Fed. Rep. of Germany ...... 362/226
31-18775 11/1956 Japan .
37-32174 12/1962 Japan .
1124788 8/1968 United Kingdom ................ 362/226

*Primary Examiner*—Howard Britton
*Attorney, Agent, or Firm*—Cushman, Darby & Cushman

[57] ABSTRACT

A linear light source fixing device of a facsimile transmission apparatus comprises a mount capable of moving between first and second positions relatively to a chassis, a pair of sockets attached to the mount to hold a fluorescent lamp, a first connector terminal member fixed on the chassis and connected with an electric power source, a second connector terminal member fixed on the mount so as to be electrically connected with the first connector terminal member when the mount is in the first position and to be electrically isolated from the first connector terminal member when the mount is in said second position, and lead wires electrically connecting the second connector terminal member with the sockets.

8 Claims, 4 Drawing Figures

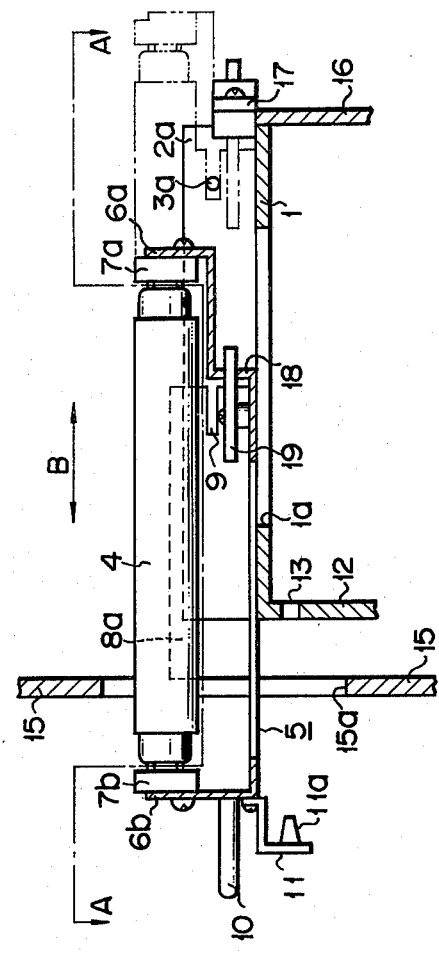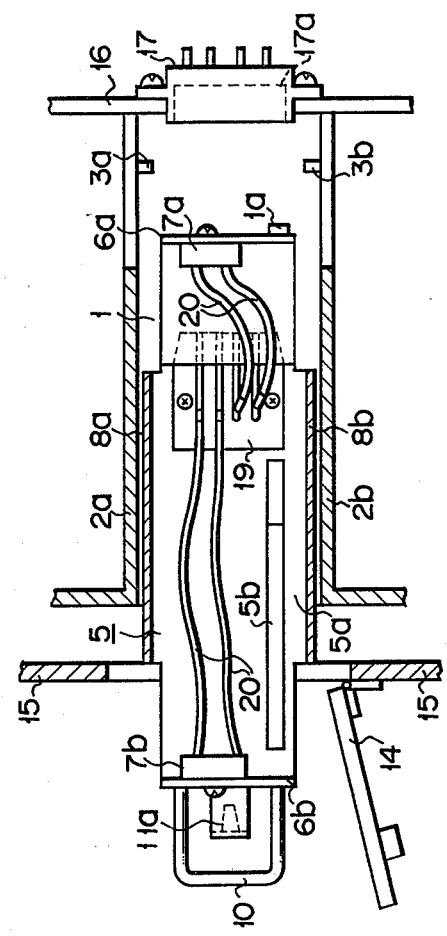
FIG. 1
FIG. 2

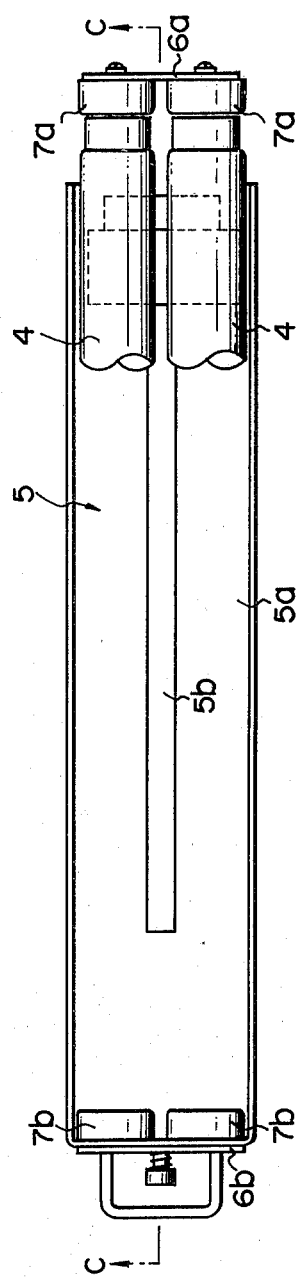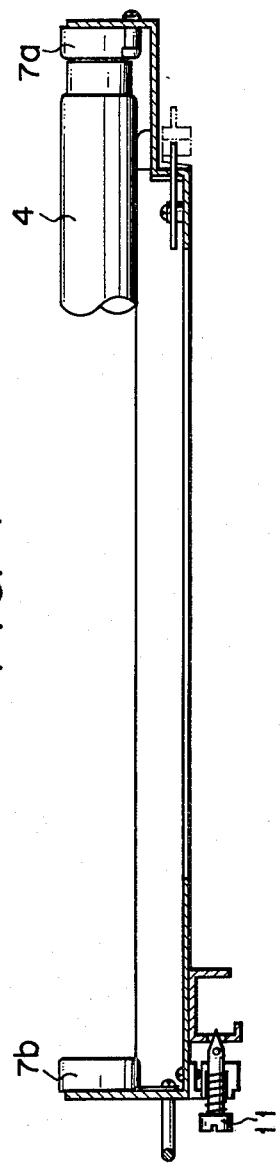

LINEAR LIGHT SOURCE FIXING DEVICE USED IN A FACSIMILE TRANSMISSION APPARATUS

This invention relates to a linear light source fixing devie used in a facsimile transmission apparatus.

In a facsimile transmission apparatus, light from a linear light source such as a fluorescent lamp is applied to an original, and reflected light from the original is read as information. In this case, the linear light source need be replaced periodically since the quantity of light emitted from the linear light source is reduced with the lapse of time. Generally, the location of the linear light source in the facsimile transmission apparatus depends on the shape and size of the apparatus and the paper feed system therein, and may be deep in the recess of the apparatus. With some locations of such linear light sources, therefore, it is hard to replace the light sources smoothly, leading to deterioration in the maintenance capability of the apparatus.

Accordingly, there is presently used means for smoothing the replacing work by drawing at replacement the linear light source together with a mount in which the light source is stored. With such means, however, lead wires for connecting the linear light source to the power source need be extended at least for a distance by which the linear light source is drawn out. In this case, moreover, there is a possibility of the plurality of lead wires getting intertwined with one another or being broken. In order to improve the building-up charcteristic of the apparatus, furthermore, power output for preheating is always applied to the linear light source, so that there is a fear that an electric-shock accident will happen at the time of replacement.

The object of this invention is to provide a linear light source fixing device used in a facsimile transmission apparatus, ensuring improved safety and simplified wire arrangements as well as simple construction and high maintenance capability.

In an aspect of the invention there is provided a linear light source fixing device of a facsimile transmission apparatus having a chassis, comprising: a mount capable of moving between first and second positions relatively to said chassis; at least one pair of sockets attached to said mount at a space from each other and holding a linear light source therebetween; a first connector terminal member fixed on said chassis and connected with an electric power source; a second connector terminal member fixed on said mount so as to be electrically connected with said first connector terminal member when said mount is in said first position and to be electrically isolated from said first connector terminal member when said mount is in said second position; and wiring means electrically connecting said second connector terminal member with said sockets.

This invention can be more fully understood from the following detailed description when taken in conjunction with the accompanying drawings, in which:

FIGS. 1 and 2 show a linear light source fixing device used in a facsimile transmission apparatus according to an embodiment of this invention, in which FIG. 1 is a longitudinal cross-sectional view and FIG. 2 is a sectional view as taken along line A—A of FIG. 1; and FIGS. 3 and 4 show a modification of a mount of the linear light source fixing device, in which FIG. 3 is a plan view and FIG. 4 is a sectional view as taken along line C—C of FIG. 3.

Now there will be described a linear light source fixing device used in a facsimile transmission apparatus according to an embodiment of this invention with reference to the accompanying drawings.

In FIGS. 1 and 2, numeral 1 designates a chassis of a facsimile transmission apparatus. The top plate of the chassis 1, which is fixed horizontally, has a slit 1a for the transmission of reflected light formed along its longitudinal direction. The chassis 1 has a pair of side plates 2a and 2b protruding upward from both lateral sides of the top plate so as to face each other. Locating pins 3a and 3b horizontally protrude from the respective inner faces of the side plates 2a and 2b near the rear ends thereof at a given distance from the top plate. A mount 5 for a fluorescent lamp 4 is set on the top plate, interposed between the side plates 2a and 2b. The base of the mount 5 is in slide-contact with the top of the top plate of the chassis 1 so that the mount 5 can slide on the chassis 1 along the longitudinal direction or the direction of an arrow B. The side plates 2a and 2b serve as guide means for the slide of the mount 5.

The mount 5 is an open-top box-like member which is composed of a horizontal base plate 5a, rear and front end plates 6a and 6b extending upward respectively from the rear and front ends of the horizontal base plate 5a, and a pair of side plates 8a and 8b each protruding upward from its corresponding side of the horizontal base plate 5a so as to face each other. A slit 5b for the transmission of reflected light is formed in the horizontal base plate 5a along the longitudinal direction thereof. The location and dimensions of the slit 5b are so set that the slit 5b may coincide with the slit 1a in the top plate of the chassis 1 when the mount 5 is brought to a storage position represented by a chain line in FIG. 1. The rear end plate 6a has a stepped portion formed in the middle thereof so that its lower portion is located ahead of its upper portion. A pair of fluorescent lamp sockets 7a and 7b are fixed respectively on the inner face of the upper portion of the rear end plate 6a and the inner face of the front end plate 6b so as to face each other. The sockets 7a and 7b are conventional ones which hold the bases of the fluorescent lamp 4 to be electrically connected therewith. The side plates 8a and 8b are formed of rectangular plate members which protrude only from the side edges of the rear portion or the wider portion of the base plate 5a. The side plates 8a and 8b have locating slits 9 which extend horizontally and open at one-side ends of their corresponding side plates. The locating pins 3a and 3b on the inner faces of the side plates 2a and 2b of the chassis 1 are fitted in the slits 9 when the mount 5 is slidden backward, thereby regulating the vertical location or elevation of the mount 5 in the storage position. A grip 10 is attached to the outer face of the front end plate 6b on the front end of the base plate 5a. Further, a downwardly extending support arm 11 is fixed on the front end of the base plate 5a, and a storage pin 11a protrudes backward from the vicinity of the extended end of the support arm 11. The storage pin 11a is fitted in and engages a hole 13 bored in a vertical under plate 12 of the chassis 1 when the mount 5 is slidden to be stored in the chassis 1, thereby defining the storage position of the mount 5. Tapered toward its tip portion, the storage pin 11a can engage the hole 13 firmly enough to lock the mount 5 to the storage position. Naturally, such locking may also be achieved by using a separate lock mechanism.

Numeral 15 designates an external casing having a window portion 15a defined in the vertical wall thereof through which the mount 5 is stored in and taken out from the chassis 1. A cover member 14 is swingably mounted on the vertical wall so as to be able to close up the window portion 15a.

A vertical mounting plate 16 is fixed to the rear end of the chassis 1, and a first connector terminal block 17 is fixedly attached to the mounting plate 16 so as to be located above the chassis 1. A rectangular fitting opening 17a is defined in the front of the connector terminal block 17, and terminals are arranged inside the fitting opening 17a. These terminals extend to the back side of the terminal block 17, and are connected to a 100-V AC power source by means of lead wires. Attached to the lower portion of the rear end plate 6a of the mount 5 is a second connector terminal block 19 which extends horizontally to penetrate a hole 18 in the lower portion. The second connector terminal block 19 is a printed-circuit substrate (PC substrate) which is composed of a rectangular, plate-like insulator and terminals formed thereon. The rear portion of the terminal block 19 is tapered backward on both sides thereof. When the mount 5 is slidden backward, therefore, the rear portion of the second connector terminal block 19 is inserted in the fitting opening 17a of the first connector terminal block 17, guided by its own tapered side faces. Thus, the mount 5 is regulated in its transverse location. When the second connector terminal block 19 engages the first connector terminal block 17 in this manner, electrical connection between these terminal blocks is achieved. The terminal portion of the second connector terminal block 17 located inside the mount 5 is connected with one end of each of lead wires 20. The other ends of some of these lead wires 20 are connected with one socket 7a, while those of the remaining lead wires are connected with the other socket 7b. The overall length of these lead wires 20 is set to a substantially minimum length necessary for the electrical connection between the terminals of the second connector terminal block 19 and the sockets 7a and 7b, lest the lead wires 20 should suffer undesired sag.

Now there will be described the operation of the device of the above-mentioned construction.

In replacing the fluorescent lamp 4, the cover member 14 is first swung to open the window portion 15a of the external casing 15. Then, the grip 10 is pulled forward to slide the mount 5 forward on the chassis 1, thereby causing the mount 5 to jut out from the external casing 15 through the window portion 15a. At this time, the second connector terminal block 19 is also moved forward, so that it is released from the engagement with the first connector terminal block 17. As a result, electric power supply to the sockets 7a and 7b through the connector terminal blocks 17 and 19 is interrupted automatically. In this state, the fluorescent lamp is replaced with new one outside the external casing 15. Thereafter, the grip 10 is pushed to slide the mount 5 backward, thereby bringing the mount 5 to the storage position. Thereupon, the first and second connector terminal blocks 17 and 19 engage each other to be electrically connected. Since the engagement between these two terminal blocks 17 and 19 is obtained through the sliding or guiding contact between the tapered side faces of the terminal block 19 and the inner side face of the fitting opening 17a of the terminal block 17, the mount is regulated in its transverse location. Further, the regulation of the mount in its vertical location is achieved by the engagement between the locating pins 3a and 3b and the slits 9 as well as between the storage pin 11a and the hole 13.

Thus, the facsimile transmission apparatus is made ready for an operation. In the operation, light emitted from the fluorescent lamp 4 is applied to an original (not shown) moving horizontally over the fluorescent lamp 4. Reflected light from the original is received by a conventional light-electric converter (not shown) via the slit 5b of the mount 5 and the slit 1a of the chassis 1, and is converted into an electric signal by the converter. Thereafter, the electric signal is processed and transmitted by suitable conventional means.

With the apparatus of the above-mentioned construction, there is no possibility of any electric-shock accident during the replacement of the fluorescent lamp, so that the safety of the replacing work can be ensured. Since the power source and the lead wires connecting the sockets thereto are connected severally through the first and second connector terminal blocks, the wire arrangement on the chassis side is independent of the wire arrangement on the mount side. Accordingly, the total length of each lead wire is reduced and the wire arrangements are simplified, so that there is no fear of the plurality of lead wires getting intertwined with one another or being broken while the mount is sliding. Since the mount can be drawn out through the window portion of the external casing, the fluorescent lamp can be replaced easily and quickly without removing the external casing.

Although a fixing device for a single linear light source or fluorescent lamp has been described in connection with the above embodiment, the mount may be so constructed as to be able to bear two or more linear light sources. Referring now to FIGS. 3 and 4, there will be described a fixing device for two linear light sources. In these figures like reference numerals are used to designate substantially the same portions as those of the foregoing embodiment. Detailed description of such same portions will be omitted to avoid repetition.

A slit 5b for the transmission of reflected light is formed substantially in the center of a base plate 5a of a box-like mount 5. Two sockets 7a and 7b are fixed on the inside of each of rear and front end plates 6a and 6b of the mount 5, spaced from each other along the transverse direction. Each of two fluorescent lamps 4 is set between each of these two pairs of sockets 7a and 7b. The slit 6b is located between these two fluorescent lamps 4, so that reflected rays of light from an original irradiated by the fluorescent lamps 4 are led out under a chassis of a facsimile transmission apparatus through the slit 5b. A storage pin 11 on the mount 5 is bayonet-connected with the chassis to secure the retention of the mount 5 in its storage position.

The first and second connector terminal members are not limited to the plate-like configuration, and can be pillar-shaped, for example. Further, the coupling between these terminal members may be achieved inserting the first connector terminal member attached to the chassis into the second connector terminal member on the mount. Moreover, such coupling is not limited to the insertion method, and may be abuttal-engagement, for example. When using such engagement style, however, it is advisable to separately providing means for regulating the transverse location of the mount. Although the mount is so designed as to be able to move in slide-contact with the top of the chassis in the aforementioned embodiment, it may also be moved by means of rollers or tires attached to the mount or chassis. In this case, the chassis or mount without the rollers or tires may be provided with rails on which the rollers or tires roll. The moving direction of the mount is not limited to the longitudinal direction thereof, and may be a transverse or diagonal direction.

What is claimed is:

1. A linear light source fixing device of a facsimile transmission apparatus having a chassis, comprising:
   a mount capable of moving between first and second positions relatively to said chassis;
   at least one pair of sockets attached to said mount at a space from each other and holding a linear light source therebetween;
   a first connector terminal member fixed on said chassis and connected with an electric power source;
   a second connector terminal member fixed on said mount so as to be electrically connected with said first connector terminal member when said mount is in said first position and to be electrically isolated from said first connector terminal member when said mount is in said second position; and
   wiring means electrically connecting said second connector terminal member with said sockets.

2. A linear light source fixing device according to claim 1, further comprising regulating means for regulating the location of said mount in said first position relative to said chassis.

3. A linear light source fixing device according to claim 2, wherein said regulating means includes first means for regulating the location of said mount along the moving direction thereof.

4. A linear light source fixing device according to claim 3, wherein said regulating means includes second means for regulating the location of said mount along a direction normal to said moving direction.

5. A linear light source fixing device according to claim 4, wherein said first connector terminal member has a fitting opening, and said second connector terminal member has a connector terminal block one end portion of which is fitted in the fitting opening of said first connector terminal member to be electrically connected therewith.

6. A linear light source fixing device according to claim 5, wherein said second means has tapered surfaces formed on the side faces at said one end portion of said connector terminal block so as to be able to be in slide-contact with the inside of the fitting opening of said first connector terminal member.

7. A linear light source fixing device according to claim 1, wherein said mount is slidably set on said chassis.

8. A linear light source fixing device according to claim 7, wherein said mount is in the shape of an elongated box and can slide along the longitudinal direction thereof.

* * * * *